Roger Q. Fields
INVENTOR

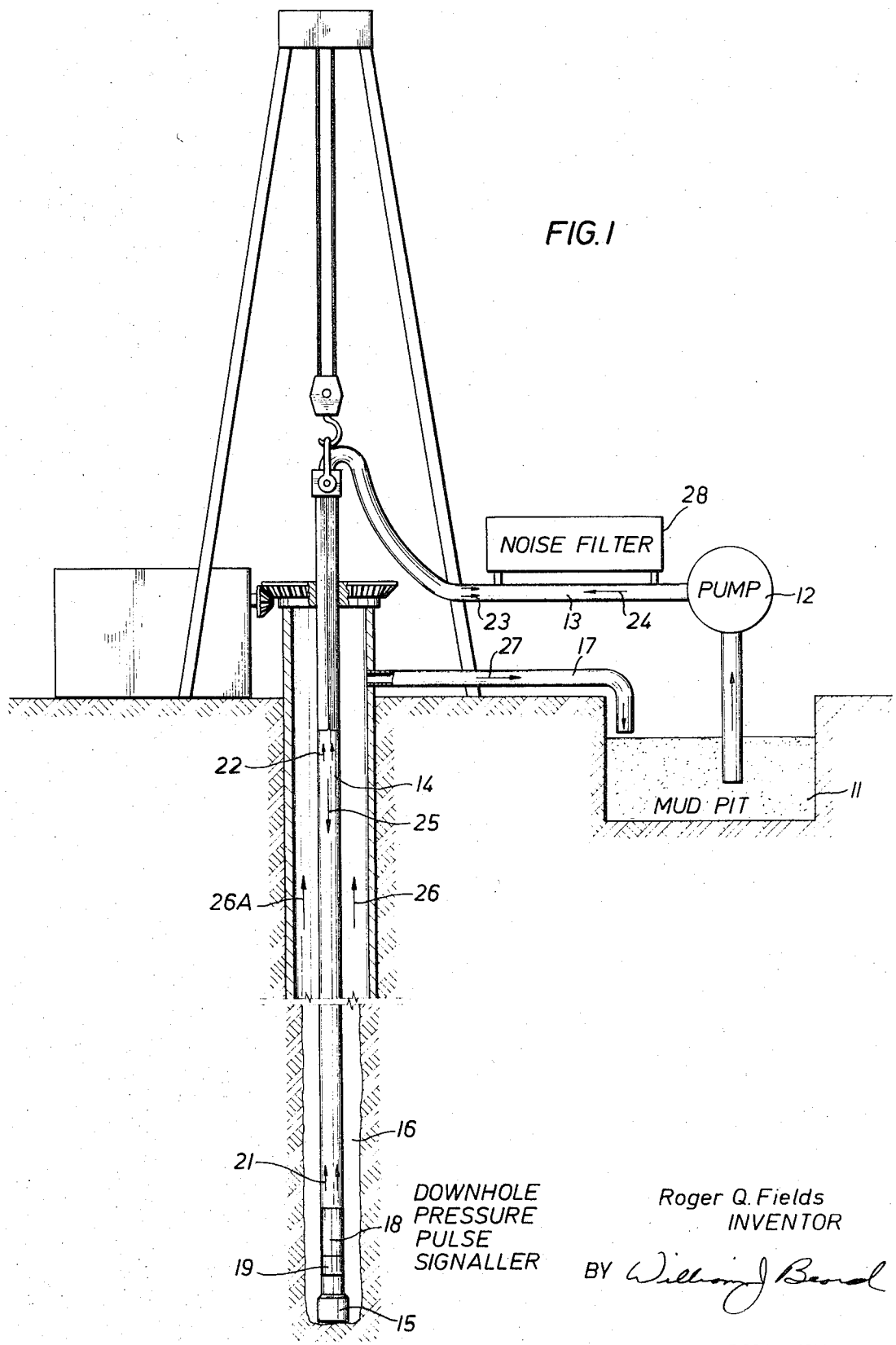

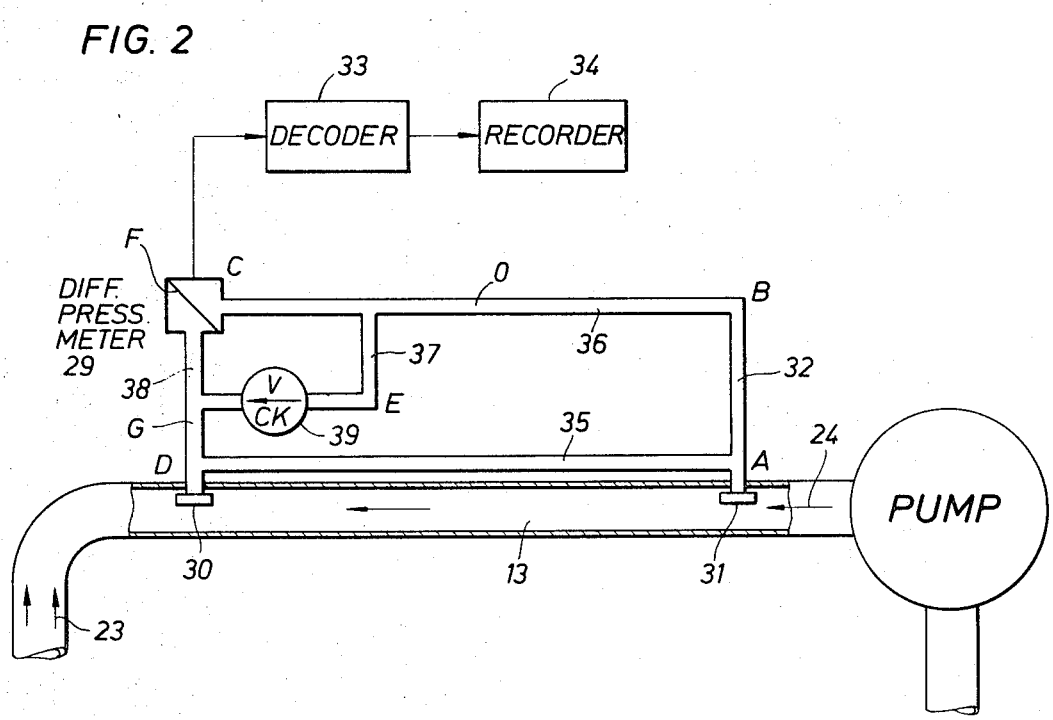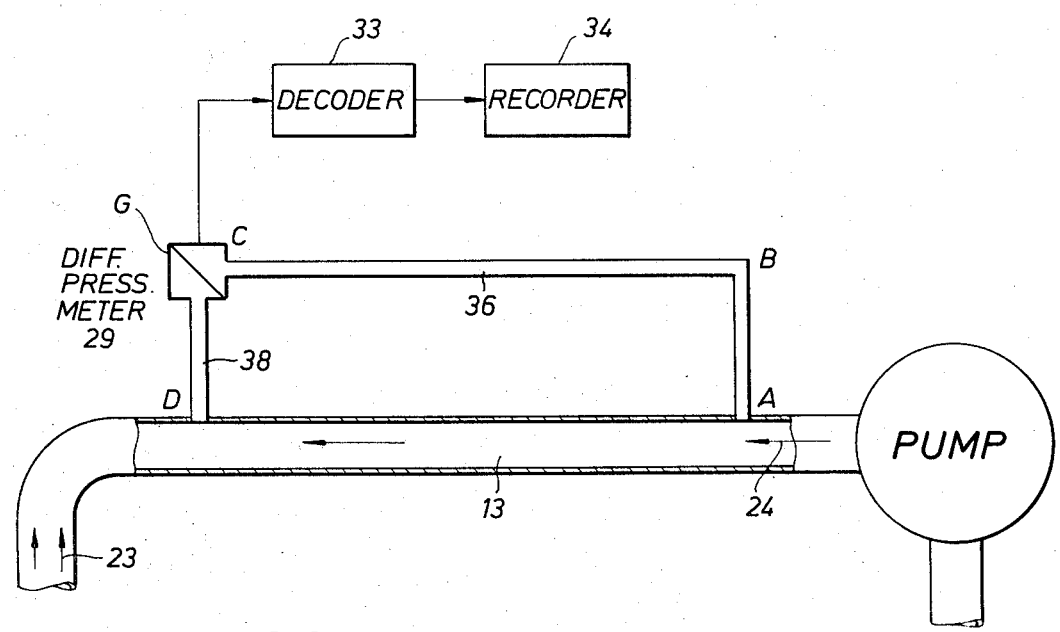

ATTORNEY

United States Patent Office 3,555,504
Patented Jan. 12, 1971

3,555,504
PRESSURE WAVE NOISE FILTER
Roger Q. Fields, Houston, Tex., assignor to Schlumberger Technology Corporation, New York, N.Y., a corporation of Texas
Filed Dec. 12, 1968, Ser. No. 783,239
Int. Cl. H04b 11/00
U.S. Cl. 340—18                        13 Claims

ABSTRACT OF THE DISCLOSURE

An illustrative embodiment of the present invention in pressure pulse signal detecting systems for use in detecting downhole data transmitted to the surface in the form of encoded pressure pulses in the drilling fluid flow lines while drilling a well, includes a noise filter for enabling detection of such pulses in the presence of noise due to the mud pump. The noise filter includes a differential pressure sensor having opposite fluid pressure inputs connected to spaced points in a flow line by means providing equal travel times to opposite inputs of the sensor for pressure pulses due to the pump, but providing unequal travel time to opposite sensor inputs for pressure pulse signals arriving from a downhole signalling device. This enables the pump noise to be effectively cancelled while the downhole signals are detected.

BACKGROUND OF THE INVENTION

This invention relates generally to data transmission systems used for making measurements while drilling a borehole, and more particularly, to an apparatus for reliably detecting pressure pulse signals originating downhole and travelling to the surface through the drilling fluids.

It has long been recognized in the oil industry that the obtaining of data from downhole during the drilling of a borehole would provide valuable information to the drilling operator. Such information as the true weight on the bit, the inclination of the borehole, fluid pressures and temperatures at the bottom of the hole, and the radioactivity of the substances encountered by the drill bit are all quantities of interest to the drilling operator. A number of prior art proposals for measuring these data while drilling and for transmitting information to the surface have been made. Among these proposals are the use of the drill pipe as an electrical conductor to transmit electrical signals to the surface, the transmission of sonic signals to the surface through the drill pipe, the release of radioactive or colored dye markers in the drilling fluid which is circulated in the well bore, as well as several schemes for pressure pulse signalling through the drilling fluid. However, to date, none of these proposals has been very successful.

Perhaps the most promising one of the prior art proposals in a practical sense, has been signalling by pressure pulses in the drilling fluid. However, the presence of a high ambient noise level has placed certain limitations on this system, the noise being primarily due to pressure pulses introduced into the drilling fluid lines by the pump system used to circulate the drilling fluid. In typical rotary drilling techniques, a large pump located at the surface is used to pump drilling fluid or "mud" down the drill pipe, through the bit, and back to the surface through the annulus between the drill pipe and the wall of the well bore. In order to circulate the necessarily large quantities of fluids, very powerful pumps are used. Typically, such pumps are of the reciprocating piston type which produce during their operation rather large pressure pulses in the mud lines. It is precisely these pressure pulses which interfere with the reception of relatively lower level pressure pulses from the downhole pressure pulse signalling system which is associated with the downhole measuring equipment in a measurement while drilling system. In order for such signalling systems to be useful in transmitting data, some means must be provided to discern the useful data signal in the midst of the pumping noise.

Accordingly, it is an object of this invention to provide a new and improved apparatus for reliably detecting useful pressure pulses in a flow line in the presence of pump noise.

A further object of the present invention is to provide a new and improved apparatus for enabling detection of signals from a downhole pressure pulse signalling device by effectively reducing the ambient noise level of the system to a point where the relatively weaker pulses from the signalling system can be detected above the pressure pulse noise produced by the mud pump.

Yet another object of the present invention is to provide a new and improved pressure pulse noise filter which functions to effectively cancel pressure pulses due to the mud pump while detecting pressure pulses due to a downhole pressure pulse signalling device.

BRIEF DESCRIPTION OF THE INVENTION

These and other objects are attained in accordance with the concepts of the present invention by the provision of a pressure pulse noise filter including a differential pressure sensor which is coupled to a drilling fluid flow line. Pressure pulses due to pump noise travel in one direction through the flow line, whereas the pressure pulses to be detected and which represent useful information travel in the opposite direction through the flow line. The opposite inputs of the sensor are connected to the flow line at spaced points downstream from the pump by separate fluid pressure communication paths. The path from the sensor to the point nearest the pump is arranged relative to the path from the sensor to the point farthest from the pump in such a manner that pressure pulses due to the pump will arrive on opposite sides of the sensor simultaneously and will not be detected thereby. On the other hand, pressure pulses travelling through the flow line in the opposite direction, or toward the pump, will arrive on opposite sides of the sensor at different times. Thus, these pulses, representing useful information, will be detected by the sensor.

The novel features of the present invention are set forth with particularity in the appended claims. The present invention, both as to its organization and manner of operation together with further objects and advantages thereof, may best be understood by way of illustration and examples of embodiments thereof when taken in conjunction with the accompanying drawings.

BRIEF DESCRIPTION OF THE DRAWINGS

FIG. 1 is a schematic illustration showing the present invention in use in conjunction with a downhole pressure pulse signalling device.

FIG. 2 is a schematic illustration showing one embodiment of the present invention in use with a downhole signalling device and attached to the mud line.

FIG. 3 shows another embodiment of the present invention in use in conjunction with the downhole signalling device and a mud pump.

DESCRIPTION OF THE PREFERRED EMBODIMENTS

Figure 4:
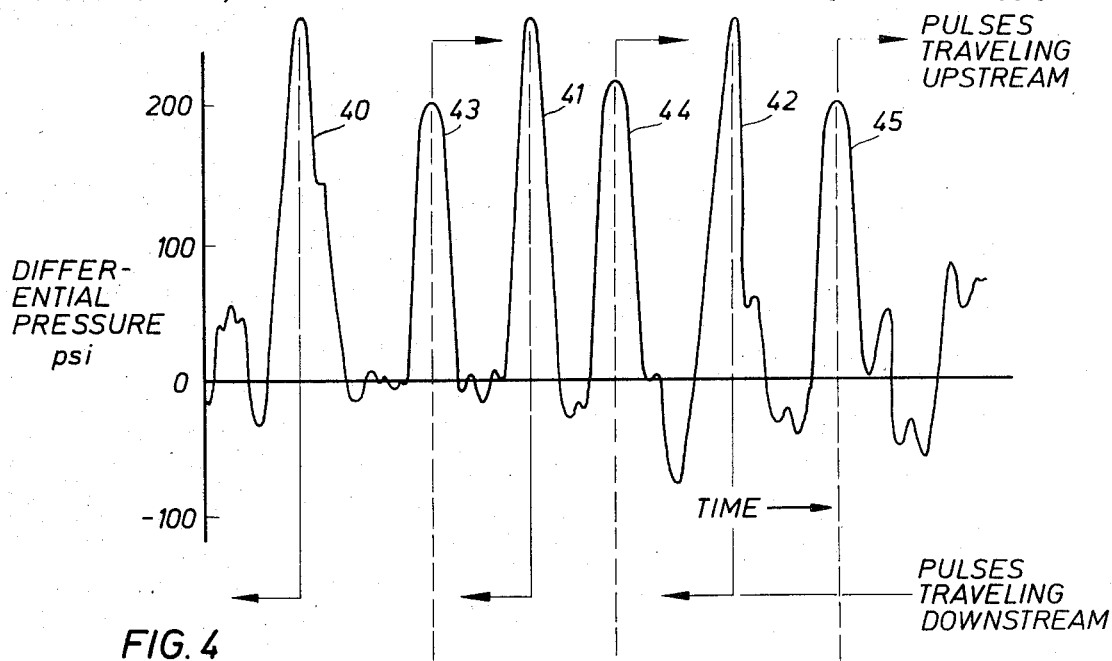
FIGS. 4 and 5 illustrate graphically the effectiveness of the present invention in removing pump noise from signals produced by the downhole signalling device.

Referring initially to FIG. 1, the present invention is shown schematically in connection with a typical rotary drilling apparatus. Drilling mud from mud pit 11 is circulated through a flow line 13 by pump 12, which may be the reciprocating piston type pump, and down through the drill pipe 14, and through the drill bit 15, the fluids returning to the surface through the annulus 16 between the drill pipe and the wall of the well bore. Upon reaching the surface, the mud is discharged through line 17 into the mud pit where cuttings of rock or other well debris are allowed to settle out before the mud is recirculated.

A downhole pressure pulse signalling device 18 is attached near the drill bit 15 and functions to transmit data derived during the drilling operation by a measuring instruments package 19. The signalling device 18 may be a valve or a variable orifice type device which creates pressure pulses in the mud stream by varying the velocity of the fluids. Such data may be encoded in a desired form by appropriate electronic means in the downhole tool. Arrows 21, 22, and 23 illustrate the path taken by the pressure pulses provided by the downhole signalling device 18. The pump 12 also produces pressure pulses in the mud stream, and these are indicated by arrows 24, 25, 26, 26A and 27 (long arrows) which also illustrate the circulation path of the mud.

In order for the downhole signals to be discernible at the surface, a noise filter 28 in accordance with the present invention is provided adjacent the pump at the surface.

The details of the noise filter 28 together with its operation are more readily explained by reference to FIGS. 2 and 3. Referring first to FIG. 3, the noise filter includes a conventional differential pressure meter or sensor 29 which may be, for example, a diaphragm type device having opposite inputs. A greater pressure on one side or the other of the meter will cause it to produce an electrical or visual output. The meter 29 is connected to the flow line 13 at spaced points A and D, the arrangement being such that the distance A-D-C is equal to A-B-C. The point A is nearer the pump 12 than the point D. Pressure pulses due to the pumping action of the pump 12 appearing at point A travel two paths to reach the differential pressure meter 29, paths A-B-C and A-D-C. Since these paths have equal lengths, the pump pressure pulses will arrive at opposite sides of the meter 29 at the same time and thereby cancel each other. Hence, the meter 29 will not indicate a pressure difference. On the other hand, pressure pulses in mud line 13 arriving from the downhole tool as shown by arrows 23 will also travel two paths to get to the differential pressure meter 29. These two paths, D-C and D-A-B-C, are not of equal length. Thus, the pulses will not arrive on opposite sides of the meter 29 simultaneously and a pressure differential will be produced across the diaphragm of the meter and an output will be produced. This output may then be decoded by an appropriate decoding circuit means 33 and then recorded in the manner desired by a recording means 34. Such data may, for instance, comprise binary numbers which represent certain parameters of interest to the driller measured by the downhole instrumentation package 19 and transmitted by the signalling device 18 to the surface.

Another embodiment of the noise filter of the present invention is shown in FIG. 2. In this embodiment, the noise filter includes the meter or sensor 29 having opposite inputs coupled to spaced points A and D in the flow line 13 by conduits 32, 36 and 38 which function to communicate fluid pressures. The conduits 32, 36 and 38 are separated from the fluids in the flow line 13 by diaphragm devices 30 and 31 or the like, which pass pressure pulses but isolate fluids in the conduits from those in the flow line. Thus the noise filter is constructed as a closed loop hydraulic system which may be entirely filled with a clean fluid O such as water, clear oil or the like which prevents contaminants present in the drilling fluid from entering the system. The conduits 32 and 38 are joined by an additional conduit 35, and the conduits 36 and 38 are joined by a conduit 37 having a one-way check valve 39.

The operation of the embodiment shown in FIG. 2 may be described as follows. A pump pressure pulse 24 present at point A can travel through two equal length paths to get to the opposite inputs of the meter 29. A portion of the pulse will travel Path A-D-F while the other portion will travel Path A-B-F through lines 32 and 36. These paths can be of equal length and provide equal travel times for the pressure pulses from the pump 12 so that they reach opposite sides of the diaphragm of the pressure meter 29 simultaneously and thereby produce no differential pressures across the diaphragm. Hence, no output is obtained from the meter. On the other hand, pressure pulses from the downhole signalling device 18, as indicated by the arrows 23, can arrive at the point D and travel two paths which may be of unequal length to get to the opposite inputs of the meter 29. The shorter Path D-F will be traversed by this pressure pulse more quickly than it can traverse the longer Path D-A-B-F and thus such pressure pulse will provide a differential pressure across the diaphragm of meter 29 and hence will provide an output signal from the meter.

The check valve 39 in the conduit 37 operates to suppress reflected pressure transients that may otherwise occur in the conduit 36. For further detail, reference is made to a copending application Ser. No. 783,233 filed Dec. 12, 1968 and entitled "Pressure Wave Noise Filter Including Reflected Wave Suppression" by Jackson R. Claycomb now issued as U.S. Pat. No. 3,488,629 and assigned to the assignee of the present application. The conduit 35 functions to equalize fluid pressures between the conduits 32 and 38 to prevent the check valve 39 from trapping fluid pressure in the conduit 38, and preventing possible damage to the diaphragm device 30 or to the meter 29. The propagation time of pressure pulses in the clean fluid O in conduit 35 should be the same as the propagation time of pressure pulses in the flow line 13 between points A and D. The length of line 35 may be adjusted to give this relationship for whatever fluid O that is used. In any event, the travel times for Paths A-D-F and A-B-F are the same.

Figure 5:
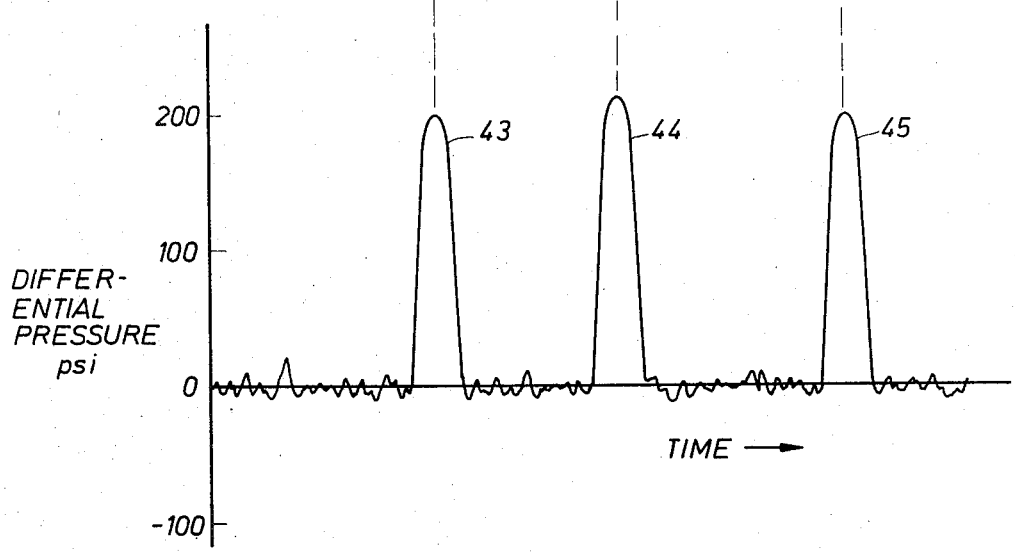

Referring now to FIGS. 4 and 5, the effectiveness of the noise filter of the present invention may be seen. In FIG. 4, the pressure pulses present at point G of FIG. 2 are illustrated. Large amplitude pressure pulses 40, 41, and 42 are represented as pump noise pulses travelling downstream, while pulses 43, 44 and 45 are relatively lower amplitude pressure pulses travelling upstream from the downhole signalling device 18. FIG. 5, which illustrates the output of differential pressure meter 29, shows the pressures at point F of FIG. 2. This clearly demonstrates the effectiveness of the noise filter of the present invention in eliminating or separating out the pump noise pulses travelling downstream, but enabling detection with distinct contrast the signal pulses travelling upstream. As may readily be appreciated, it would be extremely difficult to interpret the pulse pattern of FIG. 4, while the pulse pattern of FIG. 5 may be clearly distinguished and interpreted. With the use of the present invention, pressure pulses such as 43, 44 and 45 generated at distances in excess of 13,000 feet and at rates in excess of 10 pulses per second may be easily detected above the ambient noise level produced by the mud pump at the surface. Of course, the distance between the spaced points A and D in the fluid flow line may be optimized with regard to the sensitivity of the meter 29 and the frequency of generation of the signal pressure pulses.

While particular embodiments of the present invention have been shown and described, it is apparent that changes may be made without departing from this invention in its broader aspects and therefore the aim in the appended claims is to cover all such changes and modifications as fall within the true spirit and scope of this invention.

What is claimed is:

1. Apparatus for detecting pressure pulse signals transmitted in the drilling fluid line while drilling a well, comprising:

means having at least two fluid pressure inputs for detecting pressure differentials between said inputs;
means for simultaneously communicating pressure pulse signals transmitted in a first direction in the drilling fluid line to the inputs of said differential pressure detecting means; and
means for communicating pressure pulse signals transmitted in a second, preferred, direction in the drilling fluid line to the inputs of said differential pressure detecting means at different times,
whereby the simultaneously arriving pressure pulse signals cancel and the pressure pulse signals arriving at different times are detected.

2. Apparatus for detecting pressure pulse signals in the drilling fluid line from a downhole signalling device while drilling a well, comprising:

means for detecting differential fluid pressure having at least two fluid pressure inputs and connected to said drilling fluid line at two spaced points, a first point and a second point and capable of detecting pressure differentials between said inputs;
means for providing two equal length fluid pressure communication paths from said first point in the drilling fluid line to the inputs of said differential pressure detecting means; and
means for providing two unequal length fluid pressure communication paths from said second point in the drilling fluid line to said inputs, whereby a pressure pulse going from said first point in the drilling fluid line toward said second point arrives simultaneously at said inputs of said differential pressure detecting means and is not detected but a pressure pulse going from said second point in the drilling fluid line toward said first point does not arrive simultaneously at said inputs of said differential pressure detecting means and is detected.

3. Apparatus for detecting pressure pulse signals in a well-drilling fluid line from a downhole pressure pulse generator under drilling conditions of a well, comprising:

a differential pressure meter having two fluid pressure inputs and capable of detecting fluid pressure differentials between said two inputs and producing an output signal representative of said pressure differential;
a first fluid communication path to one of said differential pressure meter inputs and connected to a first point in said drilling fluid line;
a second fluid communication path to the other of said differential pressure meter inputs and connected to a second point in said drilling fluid line and in fluid communication with said first fluid communication path, said first fluid communication path and said second communication path, including their interconnecting fluid communication path, being of equal length from the first of said points in said drilling fluid line to each of the inputs of said differential pressure meter, but said first and second fluid communication paths together with their interconnection fluid communication path being of unequal length from the second of said points in said drilling fluid line to the inputs of said differential pressure meter;
whereby, a pressure pulse entering said fluid communication paths from the first of said points and travelling toward said second point, travels said equal length paths to said differential pressure meter inputs and hence appears simultaneously at said meter inputs and produces no output signal from said meter, but pressure pulse signals entering said fluid communication paths from the second of said points and travelling toward said first point, travels said unequal length paths and hence produces a pressure differential between the inputs of said differential pressure meter.

4. The apparatus of claim 3 and further including means for decoding said electrical signals representative of pressure differentials between the inputs of said differential pressure meter and means for recording said signals.

5. In a system for use in making measurements while drilling a well, apparatus for filtering pressure pulses due to the mud pump from the drilling fluid line, comprising:

a differential pressure meter having two fluid pressure inputs and capable of detecting fluid pressure differentials between said two inputs and producing an electrical output signal reprsentative thereof;
first fluid pressure communicating means for providing a fluid communication path from a first point in said drilling fluid line to a first fluid input of said meter;
second fluid pressure communicating means for providing a fluid communication path from a second point in said drilling fluid line to the opposite input of said meter;
third fluid pressure communicating means for providing a fluid communication path between said first and second fluid pressure communicating means, the path length of pressure pulses travelling from said first point toward said second point through said third and second fluid pressure communicating means to one of said meter inputs being equal in length to that through said first fluid pressure communicating means to the other of said meter inputs, but the path length of fluid pressure pulses travelling from said second point toward said first point through said second fluid communicating means to one input of said meter being unequal to the path length from said second point through said second and first fluid communicating means to the opposite input of said meter, thereby allowing detection of pressure pulses arriving at said meter inputs from said second point in the drilling fluid line but not from said first point in the drilling fluid line.

6. The appartus of claim 5 and further including means for decoding said electrical signals representative of pressure differentials between the inputs of said differential pressure meter and means for recording said signals.

7. The apparatus of claim 5 wherein said first, second and third fluid pressure communicating means are isolated from fluid flow from said drilling fluid line but remain in fluid pressure communication with said drilling fliud line.

8. The apparatus of claim 7 wherein all of said fluid pressure communicating means are in fluid pressure communication with said drilling fluid line but isolated therefrom by plural, flexible, non-porous diaphragms.

9. The apparatus of claim 6 wherein said fluid pressure communicating means are filled with a clean fluid.

10. The apparatus of claim 7 wherein said fluid pressure communicating means are filled with a clean fluid.

11. Apparatus for use in separating wanted pressure signals from unwanted pressure signals travelling in opposite directions through a fluid flow line, comprising: a differential pressure indicator having opposite sides; and means connecting said indicator with the flow line for imposing said unwanted pressure signals on the opposite sides of said indicator simultaneously and for imposing said wanted pressure signals on the opposite sides of said indicator at different times, whereby said unwanted pressure signals arrive on opposite sides of said indicator in phase with one another, and said wanted pressure signals arrive on opposite sides of said indicator out of phase with on another.

12. The apparatus of claim 11 wherein said means is constituted by unequal length conduits, said conduits connecting opposite sides of said indicator with spaced points in the flow line, said conduits together with the flow line between said spaced points defining a quadrilateral, said indicator being located at a corner of said quadrilateral.

13. The apparatus of claim 11 wherein said means is constituted by a first conduit connecting one side of said indicator with a first point in the flow line, and a second conduit connecting the other side of said indicator with a second point in the flow line spaced from said first point, the length of said second conduit being equal to the length of said first conduit plus the distance between said first and second points.

References Cited

UNITED STATES PATENTS 3,302,457    2/1967    Mayes _____ 340—18X

RODNEY D. BENNETT, Jr., Primary Examiner

D. C. KAUFMAN, Assistant Examiner

U.S. Cl. X.R.

137—557